United States Patent
Rosi et al.

(10) Patent No.: US 6,569,060 B2
(45) Date of Patent: May 27, 2003

(54) METHOD FOR CONTROLLING A TRANSMISSION OF A VEHICLE

(75) Inventors: Hansjörg Rosi, Meckenbeuren (DE); Wolfgang Netzer, Kressbronn (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/938,179

(22) Filed: Aug. 23, 2001

(65) Prior Publication Data

US 2002/0042326 A1 Apr. 11, 2002

(30) Foreign Application Priority Data

Aug. 26, 2000 (DE) .......................... 100 42 147

(51) Int. Cl.[7] .................. F16H 61/26; G06F 17/00; G06F 19/00; G06F 7/00
(52) U.S. Cl. ..................... 477/156; 477/117; 701/58
(58) Field of Search .................. 477/156, 158, 477/50, 117, 121; 701/51, 55, 67, 54, 56, 58, 66

(56) References Cited

U.S. PATENT DOCUMENTS

| | | | | |
|---|---|---|---|---|
| 4,742,461 A | * | 5/1988 | Eschrich et al. ............. | 477/143 |
| 5,462,499 A | * | 10/1995 | Bullmer et al. ............. | 477/109 |
| 5,785,629 A | * | 7/1998 | Gierer et al. ............... | 477/121 |
| 6,095,948 A | * | 8/2000 | Depping et al. ............. | 477/143 |
| 6,101,438 A | * | 8/2000 | Staiger et al. .............. | 477/117 |
| 6,341,552 B1 | * | 1/2002 | Potter et al. ................. | 91/433 |
| 6,366,843 B1 | * | 4/2002 | Dreibholz et al. ........... | 701/51 |

FOREIGN PATENT DOCUMENTS

| | | | | |
|---|---|---|---|---|
| DE | 10038324 | * | 2/2002 | ........... F16H/61/06 |
| JP | 2002106704 | * | 4/2002 | ........... F16H/61/04 |

* cited by examiner

*Primary Examiner*—Sherry Estremsky
*Assistant Examiner*—Tisha D. Lewis
(74) *Attorney, Agent, or Firm*—Davis & Bujold, P.L.L.C.

(57) ABSTRACT

A method for controlling a transmission of a motor vehicle, especially of an automatic transmission or of an automated manual mechanical transmission. The transmission has hydraulically actuatable shifting elements which, during gear shifts, are engaged or disengaged via pressure curves ($p\_kzu$, $p\_kab$) stored in an electronic control unit. For one gear shift are carried out at least one adaptation of the pressure curves ($p\_kzu$, $p\_kab$) of the shifting elements for compensation of tolerances of components and alternative to this one adaptation for compensation of influences determinant of shifting quality for different shifting strategies and/or shifting kinds, the filling parameters of the engaging shifting elements being determined during the gear shift itself or by preset test pressure curves outside the gear shift.

9 Claims, 1 Drawing Sheet

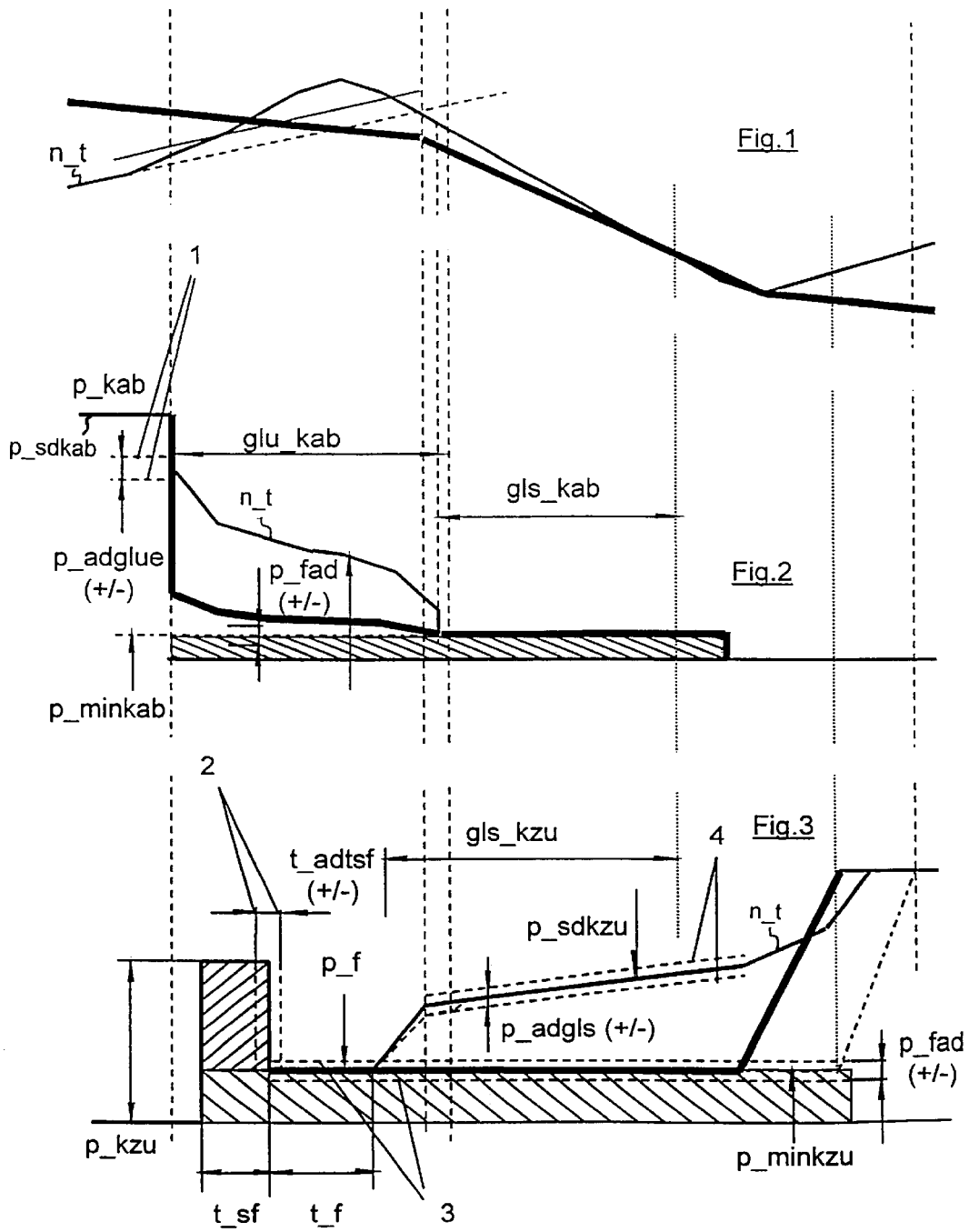

ns on the functionality by shifting quality requirement,

METHOD FOR CONTROLLING A TRANSMISSION OF A VEHICLE

FIELD OF THE INVENTION

The invention relates to a method for controlling a transmission of a motor vehicle.

BACKGROUND OF THE INVENTION

The continuously increasing demands on the functionality of automatic transmissions by shifting quality requirement, the need of more spontaneity, the constantly enlarging number of gears to be shifted and the higher economy requirements on automatic transmissions are taken into account in the practice by an adaptive control for automatic transmissions. With such an adaptive transmission control (AGS), the generally pursued end is to adapt the gear selection to the behavior of the individual driver and, at the same time, taking into consideration the environmental conditions and the concrete driving situations. Thereby the control comfort should be improved, among other things, by reducing both the required engagements by the driver and the shifting frequency in sporting driving mode. Besides, in the smooth driving mode, the fuel consumption to be lowered, the same as the driving safety increased on even roads, for example.

One adaptive transmission control used in the practice engages, for example, four shifting programs which upwardly and downwardly enlarge the band width of the programs formerly used. Besides, for automatic selection of the shifting programs and gear selection according to situations, functions have been introduced which can be classified in four function blocks: a driver type recognition, an environment recognition, a driving situation recognition and a manual engagement. In the driver type recognition, a conclusion as to the driver's wish is reached from the evaluation of characteristic accelerator pedal actuations, one of four shifting programs being chosen from the results of the analysis. Via the functions of the environment recognition elevated traction resistances can be found which are caused, for example, by high loading or road gradients. In addition, low adhesion coefficients between tires and road can be detected. In both cases, shifting programs are called up which are optimized with regard to the special situations. The recognition of the driving situation reacts to actual events, such as driving downhill, and makes gear shifts possible which diverge from instructions stored in the form of characteristic lines. The function block "manual engagements" further offers to the driver the possibility of influencing the gear selection via the selector lever and the program selector caliper.

It is disadvantageous, however, that even though an optimization of the gear selection of the automatic transmission can be carried out via the adaptive control, an adaption of the gear shift itself, that is, effected in the automatic transmission cannot be directly carried out.

In order to be able to satisfy a requirement of adaptation of a gear shift to tolerances of component parts of shifting elements of the automatic transmission, it has been changed over in the practice to taking into account, the influences of the tolerances of component parts of the shifting elements of the transmission during a gear shift. It is here established, firstly, how a transmission or a shifting element of the automatic transmission affected with tolerances of component parts behaves during a gear shift under minimum and maximum specific tolerance. With the aid of this observation, a shifting cycle is established wherein, with the shifting cycle based on the tolerances of component parts, there are tuned and stored in an electronic control unit pressure curves for a filling pressure abutting on a shifting element during a filling phase and a differential pressure abutting on the shifting element during a shifting phase which constructively acts upon the filling pressure, ultimately produces the engagement of the shifting element.

In view of the multiplicity of influences appearing on all operating points due to the tolerances of components, scatterings of operating parameters of the automatic transmission and other influences, it is not possible with the former steps to deduce the correct reaction in order to optimize a gear shift that follows an evaluated gear shift. From speed reactions at the input or output of the transmission or with the aid of pressure and regulation values of the transmission control, it is not possible to deduce adaptation values which can be corrected on the respective operating point of the automatic transmission shifting inaccuracies due to tolerances of components and wear of the shifting elements, the same as temperature influences and scatterings of the operating parameters.

Therefore, the problem on which this invention is based is to make a method for control of a transmission of a motor vehicle available which, for each of the different influences which impair a gear shift, a separate adaptation can be carried out from which can be deduced the respective right reaction for an optimization of a subsequent gear shift.

According to the invention said problem is solved with a method according to claim 1.

SUMMARY OF THE INVENTION

With the aid of the inventive method in which for each gear shift, at least one adaptation of the pressure curves of the control pressure of the shifting elements for compensation of tolerances of components, preferably of the shifting elements taking part in the gear shift, and one for compensation of influences determinant of the shifting quality on the shifting elements are alternatively carried out for different shifting strategies or kinds of shifting, it is quickly possible to compensate tolerances and wear of component parts of the shifting elements, for example.

It is essential to the invention that the filling parameters of the clutches can be determined or evaluated both during a normally developing gear change and also by special pressure curves controlled outside gear changes. The filling operation of a clutch, therefore, must not indispensably be connected with a gear shift of the transmission to be carried out, but can also be carried out in the form of predetermined test pressure curves (test pressure phase) in predetermined operating points of the transmission, the pressure curves not leading to gear change. Advantageous test pressure curves are derived from shifting parameters. A rapid filling pressure test pulse makes it possible to easily determine and adapt tolerances of the hydraulic clutch control, of the clutch release play and of the seal ring friction of the clutch piston. A filling pressure test pulse makes it possible to easily determine and adapt tolerances of the piston recoil forces of the clutch. Combinations of rapid filling pressure test pulse and charge pressure test pulse obviously can also be used. The test pressure curves are advantageously designed so that no speed reactions of the drive train, negatively traceable for the driver, occur outside the gear shifts.

By the further provided targeted optimizing adaptation of the shifting quality, it is possible to obtain more shifting comfort and an increased spontaneity of the automatic transmission since, with the adaptation for compensation of influences determinant of shifting qualities of the shifting elements, it is possible to take, into account on the relevant operating point, operating parameters such as the transmission temperature, friction values, loadings and aging of the shifting elements and to adapt to the influences of a subsequent gear shift.

The inventive method is universally utilizable for automatic transmissions, automated mechanical transmissions and continuously variable automatic transmissions where at least one shifting element is electrohydraulically actuatable.

By virtue of the alternation of the adaptations, the results of one adaptation is scarcely susceptible to error in itself other adaptations and by the separation of the influences affecting the gear shift and the subsequent interaction for the adaptation results, an altogether quickly reacting, accurate total adaptation system leading to the correct reaction can be created.

It is also an advantage that additional evaluation memories or safety factors can be eliminated, since the adaptation of the pressure curves for compensating the tolerances of components of the shifting elements prevent erroneous interpretations in the evaluation of a gear shift.

It is thus possible with the inventive method to carry out an immediate, quick and accurate adaptation of the operating point for the next gear shift and signals of the individual factors that negatively affect the shifting quality and spontaneity of the transmission can be quickly and very precisely compensated purposefully and by the adequate evaluation.

In an advantageous design of the inventive method, the adaptation of the pressure curves for compensating tolerances of component parts of the shifting elements can be carried out starting from a minimum preset tolerance range of the shifting elements taking part in the gear shift and used for different shifting strategies or kinds of shifting. There results a quick optimization of the shifting cycle of a subsequent gear shift independently of which shifting strategy or which kind of shifting is the basis.

BRIEF DESCRIPTION OF THE DRAWINGS

Other advantages and developments of the invention will now be described, by way of example, with reference to the accompanying drawings in which:

FIG. 1 is a curve of a turbine speed $n\_t$ of a turbine wheel of a converter;

FIG. 2 is a pressure curve of a pressure $p\_kab$ with which a disengaging shifting element is controlled during a gear shift; and FIG. 3 is a pressure curve of a pressure $p\_kzu$ with which an engaging shifting element is loaded during a gear shift.

DETAILED DESCRIPTION OF THE INVENTION

FIGS. 1 to 3 each show the curve of a turbine speed $n\_t$, the pressure curve of a pressure $p\_kab$ of a disengaging shifting element and the pressure curve of a pressure $p\_kzu$ of an engaging shifting element of an automatic transmission during a gear shift.

The thick continuous line represents the curve of the turbine speed $n\_t$, of the pressure $p\_kab$ and of the pressure $p\_kzu$ when a low engine torque abuts on the automatic transmissions and the thin continuous line represents the curve when a high engine torque abuts.

As shown in FIG. 1, the turbine speed $n\_t$ rises when a high engine torque abuts on the automatic transmission mainly linearly. Shortly before beginning of a regulated load take-up phase of a disengaging shifting element $glu\_kab$, the gradient of the turbine speed $n\_t$ increases and the ascent of the turbine speed $n\_t$ enlarges.

The intensified increase of the turbine speed $n\_t$ is produced by a slow opening of the disengaging shifting element or of the disengaging clutch. Starting from the first increase of the gradient of the turbine speed $n\_t$, a dotted line is shown, the increase of which corresponds to the gradient of the turbine speed $n\_t$ prior to opening of the disengaging clutch. This dotted line reproduces the curve of the turbine speed $n\_t$ for the case that no gearshift is carried out in the automatic transmission, the value of the turbine speed $n\_t$ at the end point of the line corresponds to the synchronous speed of the turbine for the initiated gear of the automatic transmission.

Parallel to the dotted line is another continuous line which reproduces a criterion for an adaptation of the pressure curves of the pressure $p\_kzu$ and of the pressure curve $p\_kab$ during the regulated load take-up phase. The dotted line and the continuous line parallel thereto represent an evaluation of the speed difference between the synchronous speed of the turbine speed $n\_t$ and the rising actual turbine speed $n\_t$. With the aid of this evaluation can be found whether the disengagement or opening of the disengaging clutch occurs too soon or too late. Depending on the result obtained, the pressure $p\_kab$ within a tolerance range, shown in detail in FIG. 2 under the numeral 1, is increased or reduced by one adaptation value $p\_adglue$.

The ascent of the turbine speed $n\_t$ is altogether needed for detection of the disengagement or the opening of the disengaging clutch and the evaluation of the gear shift and indicates at what moment the disengaging clutch opens. If the criterion of the regulated load take-up adaptation, shown by the continuous line, is exceeded, the moment is determined as an opening moment for the disengaging clutch. If the moment is prior to the desired moment, then the disengaging clutch was controlled with too low a pressure $p\_kab$ during the shifting cycle. In a subsequent gear shift, the pressure $p\_kab$ is correspondingly raised by the required value over the load take-up adaptation.

If the determined opening moment of the disengaging clutch is later than the desired moment, then the disengaging clutch had been controlled with too high a pressure $p\_kab$. The pressure $p\_kab$ with which the disengaging clutch is controlled during the gear shift is reduced with the load take-up adaptation within the adaptation range 1 by the adaptation value $p\_adglue$ in order to improve a consecutive gear shift.

When a high engine torque abuts, the turbine speed $n\_t$ rises above the criterion shown in FIG. 1 for evaluation of the gear shift for the regulated load take-up adaptation up to a maximum value and then drops to a minimum value which corresponds to a synchronization point of an engaging shifting element or of an engaging clutch and then rises again.

The curve of the turbine speed $n\_t$ when a low engine torque abuts, especially during a coasting operation, results from the fact that the engine torque drops and the turbine speed $n\_t$, dependent on the engine torque thereby, is also continuously reduced.

FIG. 2 shows the curve of the pressure $p\_kab$ with which a disengaging shifting element or a disengaging clutch is controlled during a gear shift, first, starting from a shifting pressure $k\_sdkab$, whose value is deduced from a shifting pressure characteristic field stored in an electronic control unit, to a minimum pressure p__minkab. As shown in FIG. 2, at the beginning of the regulated load take-up phase departing from the shifting pressure p__adkab, the pressure p__kab, momentarily depending on the abutting engine torque, lowers over a specific time period along a preset pressure curve also stored in the electronic control unit down to the minimum charge pressure p__minkab of the disengaging clutch. The moment at which the pressure p__kab reaches the minimum pressure value p__minkab also represents the end of the regulated load take-up phase.

To the regulated load take-up phase of the disengaging clutch glu__kab attaches the regulated load shifting phase gls__kab during which the pressure p__kab is held, for example, at the minimum pressure value p__minkab, when both high and low engine torques abut.

The pressure curve of the pressure p__kzu with which an engaging shifting element or an engaging clutch is controlled during a gear shift is shown in FIG. 3 wherein the pressure p__kzu is first held at a level below a minimum charge pressure p__minkzu. Shortly after beginning of the regulated load take-up phase glu__kab of the disengaging clutch, the engaging clutch is loaded in a manner known per se with a preset pressure curve of the pressure p__kzu over a rapid filling time t__sf.

After termination of the rapid filling phase, the pressure p__kzu is lowered to a minimum charge pressure value p__minkzu and held at this value for a specific period t__f. The period t__f represents a so-called filling equalization phase of the engaging clutch and causes the disks of the engaging clutch to abut against each other at the end of the filling equalization phase and a speed difference between the sets of disks is reduced.

After termination of the rapid equalization phase, the pressure p__kzu is raised along several pressure ramps adjacent each other to a safety pressure outside a gear shift, the engaging clutch being controlled with a differential pressure or a shifting pressure p__adkzu. The control of the engaging clutch with shifting pressure p__adkzu leads to a final closure of the engaging clutch so that an output torque can be transmitted via the engaging clutch.

An evaluation is also carried out for the shifting cycle of the engaging clutch in order to find whether the engaging clutch was closed at the foreseen moment or whether the engaging clutch was engaged in the power flow at the right moment. In this evaluation, if divergences from a desired shifting cycle are found, the pressure curve of the pressure p__kzu of the engaging clutch is changed via an adaptation according to, or in compensation of, the tolerances of the components of the engaging clutch and via an adaptation according to, or in compensation of, influences determinant of the shifting quality of the engaging clutch in order to optimize a consecutive gear shift.

A predictable minimum tolerance range of the engaging clutch forms the point of departure for the adaptations to compensate the tolerances of components of the engaging clutch. With the aid of the minimum tolerance ranges, the pressure curves of the pressure p__kzu are established and the pressure p__kab of the engaging clutch, in particular, is controlled with a filling pressure required for the filling over a needed filling time.

In the evaluation of a filling operation for an engaging clutch, if it is now found that the filling pressure abutting on the engaging clutch or the filling time has not led to a timely closure of the engaging clutch, it is established via the adaptation of the pressure curves according to the tolerances of components of components that the actual tolerances of the components are greater than the previously established minimum tolerance. This is corrected in the sense that the filling time is lengthened and the filling pressure increased. This means that in an automatic transmission used for the first time, the operation is taken up at a lower tolerance limit and by the adaptation of the pressure curves for compensation of the tolerances of components the filling time and the filling pressure are adapted to the actual conditions of the automatic transmission.

In the adjustment or adaptation of the filling time and of the filling pressure of the engaging clutch, the pressure curve of the pressure p__kzu for compensation of tolerances of components of the engaging clutch is adapted in the sense that a rapid filling time t__sf within an adaptation range, which is shown in detail in FIG. 3 under numeral 2, has been shortened or lengthened by a corresponding adaptation value t__adtsf.

In an evaluation of the gear shift following a filling operation of a clutch, if it is found that the engaging clutch had been closed too early, the rapid filling time t__sf is shortened within the adaptation range 2 by a corresponding adaptation value t__adtsf. If it is found that the engaging clutch has been closed too late, the rapid filling value t__sf within the adaptation range is lengthened by the corresponding adaptation value t__adtsf.

During the adaptation of the pressure curve of the pressure p__kzu for compensation of the tolerances of components of the engaging clutch, there results, in addition, a correction of the pressure p__kzu during the filling equalization phase, the pressure p__kzu being increased or reduced by a corresponding adaptation value p__fad within an adaptation range 3.

With the adaptation of the pressure curve of the pressure p__kzu to compensate the tolerances of components of the engaging clutch, it is ensured with certainty that a shifting phase following the filling phase, during which shifting phase the engaging clutch is controlled with differential pressure, leads to an immediate increase of the capacity for transmission of the shifting clutch.

The method described for evaluation of a filling operation of an engaging shifting element can be applied in the same manner to a normally developing gear shift and also for defined test pressure curves outside a gear shift with which the individual filling parameters are determined.

In the shifting phase of the engaging clutch, to optimize gear shifts an adaptation is carried out for the compensation of influences determinant of shifting quality of the engaging clutch. The pressure p__kzu of the engaging clutch in the shifting phase or in the regulated load shift is raised or reduced by an adaptation value p__adgls corresponding to the influences within the adaptation range 4.

In the adaptation relative to the influences determinant of shifting quality upon the separate shifting elements, in case of different shifting kinds, there are taken into account, among others, the different temperature development in a clutch, especially when upshifting or downshifting. Besides, the changes of frictional value appearing under different loads or the change of compression of the disks are preferably included in the adaptation since, due to the different loads, a certain wear of the shifting elements results which depends directly on the shifting work to be effected in the individual operating points.

In an engagement of a clutch, especially in downshifts, a light overswing of the turbine speed n__t can be observed. The overswinging of the turbine speed n__t can occur as result of a belated engagement of the corresponding shifting element or because the shifting element at the moment of engagement still had not been loaded with the required pressure.

Through the adaptation of the pressure curves for compensation of the influences determinant of shifting quality of the shifting elements combined with the overswinging of the turbine speed n_t, it is possible to establish that the undesired ascent of the overswinging of the turbine speed n_t has occurred because of too late an engagement of the engaging clutch. Thus one other gear shift can be optimized by purposefully laying before the engagement point of the engaging clutch.

For an optimization of a gear shift that follows an adaptation, there is effected in the instant embodiment a multi-step consecutive constructive adaptation, there being taken into consideration in the adaptation relative to specific tolerances of the parts the installation space of the shifting element itself, a release play of the disk sets, tolerances of a cup spring and tolerances of an O-ring friction.

The described adaptation for the pressure curves, especially the adaptation of the pressure curves for compensation of tolerances of components, further makes possible the reduction of the demand on the tolerance widths of the individual shifting elements or transmission elements. Therefrom results a great economy of the transmission, since the high demands on structural parts of an automatic transmission relative to tolerances cause elevated production costs. The change over to larger tolerance ranges is possible by the fact that with the described adaptation these can be easily and quickly compensated. Besides, the resistance to wear of the shifting elements or of the transmission elements is less fixed, i.e. a certain wear of the transmission parts can optionally be accepted, since great wear also can be compensated by the adaptation.

The adaptation performed for a gear shift under a certain kind of shifting or shifting strategy with the aid of a specific shifting element is preferably made for this shifting element the basis for all kinds of shifting or shifting strategies. This is possible since a filling of the shifting element is the same in an upshift and in a downshift. Therefore, the adaptation for each clutch or for each shifting element of the pressure curves for compensation of tolerances of components must only be carried out with one kind of shifting and the values determined can be used for all other kinds of shifting or shifting strategies.

The adaptation of the pressure curves for compensation of the tolerances of components and for compensation of influences on the shifting elements determinant of the shifting quality is preferably performed cyclically and one cycle of an automatic transmission which has been put in service only briefly can comprise only a few gear shifts of the shifting element to be observed. When the working time of the automatic transmission increases, one cycle can comprise a large number of gear shifts of the shifting element to be observed.

| Reference numerals | |
|---|---|
| 1 | adaptation range of the regulated load take-up phase of a disengaging shifting element |
| 2 | adaptation range of a rapid filling phase of an engaging shifting element |
| 3 | adaptation range of a filling equalization phase of an engaging shifting element |
| 4 | adaptation range of a shifting phase of an engaging shifting element |
| gls_kab | regulated load shifting phase of a disengaging shifting element |
| glu_kab | regulated load take-up phase of a disengaging shifting element |
| gls_kzu | regulated load shifting phase of an engaging shifting element |
| n_t | turbine speed |
| p_adgls | adaptation value of a regulated load shifting phase |
| p_adglue | adaptation value of a regulated load take-up phase |
| p_f | charge pressure |
| p_fad | adaptation value of a charge pressure |
| p_kab | pressure curve of a disengaging shifting element |
| p_kzu | pressure curve of an engaging shifting element |
| p_minkab | minimum pressure of a disengaging shifting element |
| p_minkzu | minimum pressure of an engaging shifting element |
| p_sdkab | shifting pressure of a disengaging shifting element |
| p_sdkzu | shifting pressure of an engaging shifting element |
| t_adtsf | adaptation value of the rapid filling phase |
| t_f | filling equalization phase |
| t_sf | rapid filling phase |

What is claimed is:

1. A method for controlling an automatic transmission with hydraulically actuatable shifting elements which during gear shifts are engaged and disengaged via pressure curves stored in an electronic control unit by adapting the pressure curves of the shifting elements for compensation of tolerances of transmission components, comprising the steps of:
   performing a tolerance evaluation of the transmission, including
      imposing a rapid filling pressure test pulse on at least one shifting component during a rapid filling phase of the evaluation and determining a rapid filling test result,
      imposing a charge pressure test pulse on at least one shifting component during a filling equalization phase of the evaluation and determining a charge pressure test result, and
   adapting at least one of a rapid filling time of a rapid filling phase of the transmission by a rapid filling adaption value according to the rapid filling test result and adapting a charge pressure during a filling equalization phase of the transmission by a charge pressure adaption value according to the comparison of the charge pressure test result, wherein
   each tolerance evaluation
      is performed during a period outside a period in which a gear shift occurs, and
      pressure levels of the rapid filling pressure test pulse and of the charge pressure test pulse do not initiate a gear shift.

2. The method of claim 1 for controlling an automatic transmission by adapting the pressure curves of the shifting elements for compensation of tolerances of transmission components, wherein:
   at least one of an adaptation of a rapid filling time of a rapid filling phase of the transmission and an adaptation of a charge pressure during a filling equalization phase of the transmission is dependent solely upon the tolerances of transmission components.

3. The method of claim 1 for controlling an automatic transmission by adapting the pressure curves of the shifting elements for compensation of tolerances of transmission components, wherein:
   the rapid filling test result is represented by a difference between a transmission turbine synchronization speed and an actual turbine speed during the rapid filling test pulse, the charge pressure test result is represented by a comparison of a time of an increase in the turbine speed during the charge pressure test pulse and a previously determined criterion time for an opening of a disengaging clutch component.

4. The method of claim 1 for controlling an automatic transmission by adapting the pressure curves of the shifting elements for compensation of tolerances of transmission components, wherein:

the adaptation of the pressure curves of the shifting elements for compensation of the tolerances of components is started from a minimum preset tolerance range of the shifting elements taking part in a gear shift.

5. The method of claim 1 for controlling an automatic transmission by adapting the pressure curves of the shifting elements for compensation of tolerances of transmission components, further comprising the step of:

during a gear shift, adapting the pressure curves according to shifting quality influences.

6. The method of claim 1 for controlling an automatic transmission by adapting the pressure curves of the shifting elements for compensation of tolerances of transmission components, wherein:

the steps of performing a tolerance evaluation of the transmission and adapting the pressure curves of the shifting elements for compensation of tolerances of transmission components will occur before a first gear shift of the transmission.

7. The method of claim 1 for controlling an automatic transmission by adapting the pressure curves of the shifting elements for compensation of tolerances of transmission components, wherein:

the tolerance evaluation of the transmission and adaptation of the pressure curves of the shifting elements for compensation of tolerances of transmission components will continue until the pressure curves have adapted to the actual tolerances of the transmission components.

8. The method of claim 1 for controlling an automatic transmission by adapting the pressure curves of the shifting elements for compensation of tolerances of transmission components, wherein:

the steps of performing a tolerance evaluation of the transmission and adapting the pressure curves of the shifting elements for compensation of tolerances of transmission components will occur cyclically.

9. The method of claim 5 for controlling an automatic transmission by adapting the pressure curves of the shifting elements for compensation of tolerances of transmission components, wherein:

the steps of performing a tolerance evaluation of the transmission and adapting the pressure curves of the shifting elements for compensation of tolerances of transmission components will occur before at least a first gear shift of the transmission.

\* \* \* \* \*